United States Patent [19]
Cantwell

[11] Patent Number: 6,090,001
[45] Date of Patent: Jul. 18, 2000

[54] BELT SYSTEM

[75] Inventor: Gill Cantwell, Ventura, Calif.

[73] Assignee: Paxton Products Inc., Camarillo, Calif.

[21] Appl. No.: 09/261,728

[22] Filed: Mar. 3, 1999

[51] Int. Cl.[7] .................................................. F16H 7/12
[52] U.S. Cl. ................................................................ 474/135
[58] Field of Search ................................. 474/109, 133, 474/135

[56] References Cited

U.S. PATENT DOCUMENTS 5,345,850  9/1994  Neitzell ............................... 474/135 X

OTHER PUBLICATIONS

Paxton Products Document #109474, 2 pages, Dec. 28, 1998.

Sonic Air Systems Brochure SL10112R072497, 4 pages, Sep. 1997.

Primary Examiner—Richard M. Lorence

[57] ABSTRACT

An improved belt system for direction sensitive machinery driven by three phase electric motors providing protection against inadvertent reversed rotation, and simplified belt servicing.

5 Claims, 3 Drawing Sheets

BELT SYSTEM

CROSS-REFERENCE TO RELATED APPLICATIONS

Not Applicable.

STATEMENT REGARDING FEDERALLY SPONSORED RESEARCH AND DEVELOPMENT

Not Applicable.

REFERENCE TO A MICROFICHE APPENDIX

Not Applicable.

BACKGROUND OF THE INVENTION

This invention relates to centrifugal blowers, specifically an improved belt system for the connection of three phase electric motors to such blowers.

Centrifugal blowers such as those manufactured by Paxton Products Incorporated of Camarillo, Calif., are commonly driven by two pole, three phase electric motors. Such motors are powered by three electrical conductors and can run in either direction. The direction of rotation is determined by the phase sequence of the conductors attached to the motor. It is the general practice in a new installation, to attach the three conductors randomly, and then bump start the motor to determine the direction of operation. Fifty percent of the time the motor is found to run backwards, and two wires must be switched to obtain the proper operation.

On some newer belt driven blowers, a spring loaded idler pulley has been added. While this idler provides a more stable belt tension, it also adds a new vulnerability to reverse operation. If the motor is started in reverse, the idler pulley that is normally on the slack side, is now on the taut side, and is thrown violently and repeatedly against whatever cover or stop it encounters. Substantial damage can occur to the pulley, the spring and to the belt. For this reason, some of the new spring loaded belt systems, are shipped with the belt not yet installed. This is a substantial inconvenience to the customer.

Even after successful initial installation, this vulnerability to reverse operation remains. Reverse operation can occur when a circuit breaker or junction box is replaced. In one case, all of the three phase motors in a factory reversed their operation, when the cables into the factory where accidentally reversed.

The current invention eliminates this vulnerability. When reverse operation occurs, a controlled automatic disconnection of the belt system results. This allows the blowers to be shipped from the factory fully assembled. It provides a visual indication of when disconnection has occurred, and a quick means of resetting the belt system without removing the cover. This protection against reverse operation remains through the life of the blower.

Replacing a belt on prior art spring loaded belt systems requires simultaneously deflecting the spring loaded idler while manipulating the belt off the pulleys. The current invention provides for quicker, easier, and safer belt changes.

SUMMARY

A pulley system including a spring loaded idler operating in an over center manner, and disengaging automatically in response to reversed rotation.

OBJECTS AND ADVANTAGES

Accordingly, several objects and advantages of the invention are:
a) the ability to automatically disconnect the belt drive whenever reverse operation is detected;
b) the ability to protect the mechanism when this occurs;
c) the ability to visually indicate that disconnection has occurred;
d) the capability for quick easy resetting;
e) the ability to prevent substandard pressure or volume caused by undetected reverse operation; and
f) the provision for quick, easy, safe belt changing.

DESCRIPTION OF INVENTION

Figure 4:
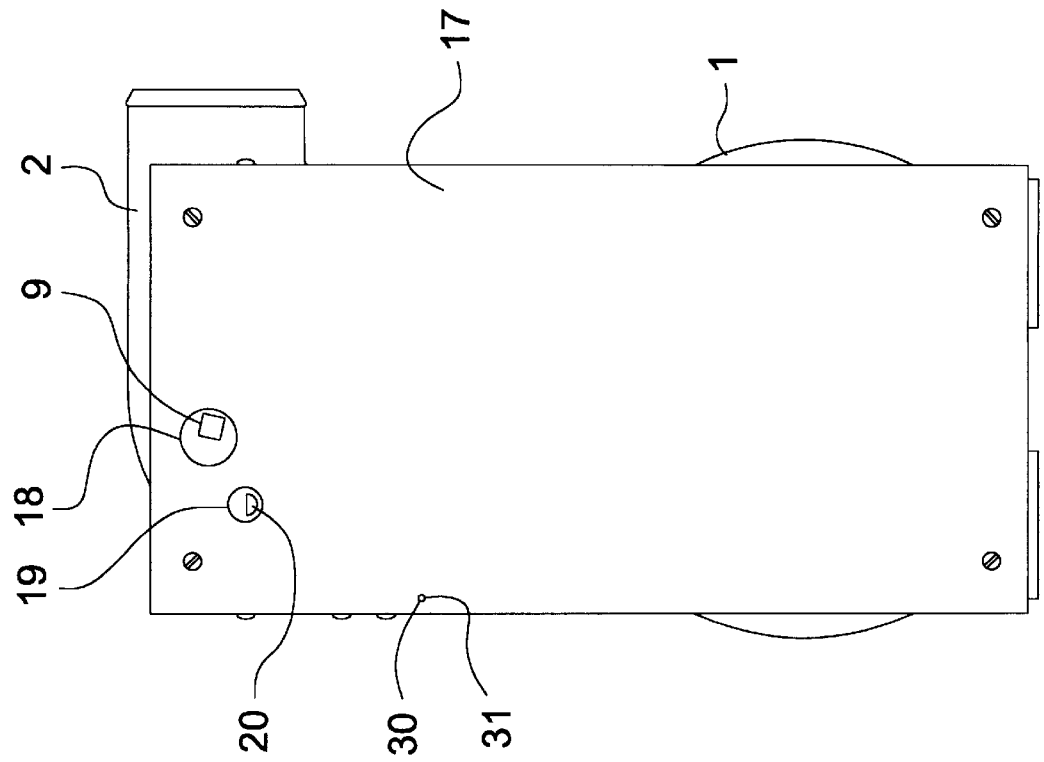
FIG. 4 is a front view of a blower assembly with the cover installed.
Figure 1:
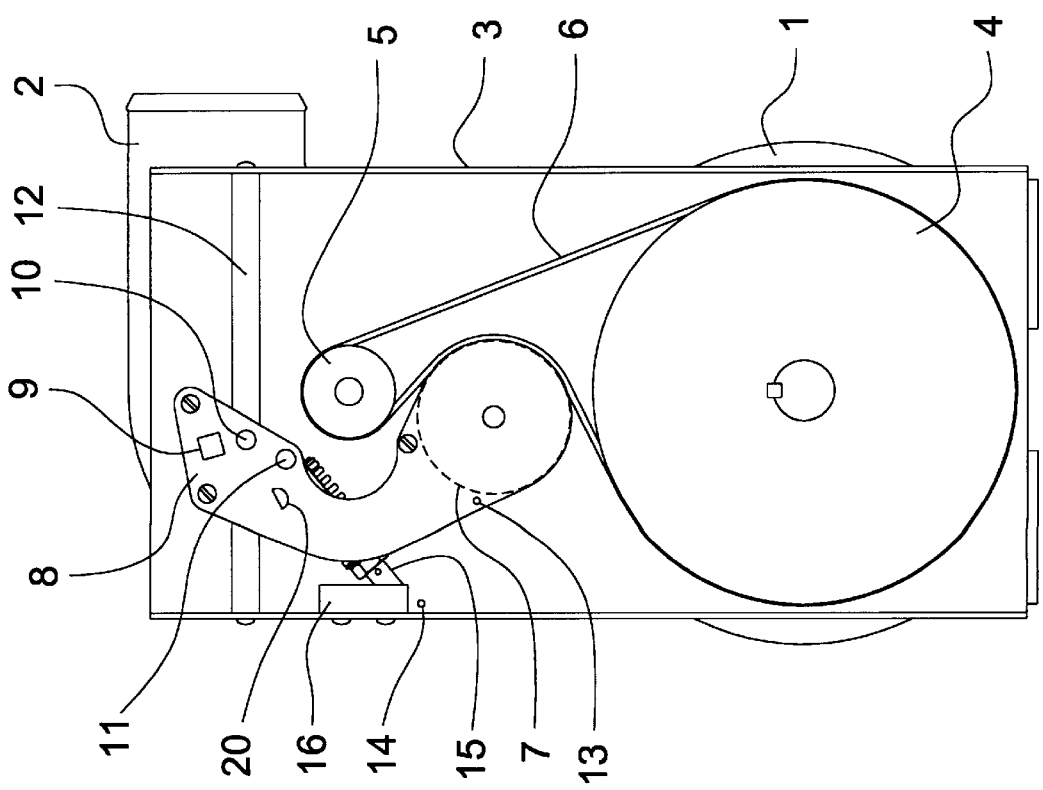
FIG. 1 is a front view of a blower assembly with the belt cover removed, and idler pulley biased against the belt.
Figure 2:
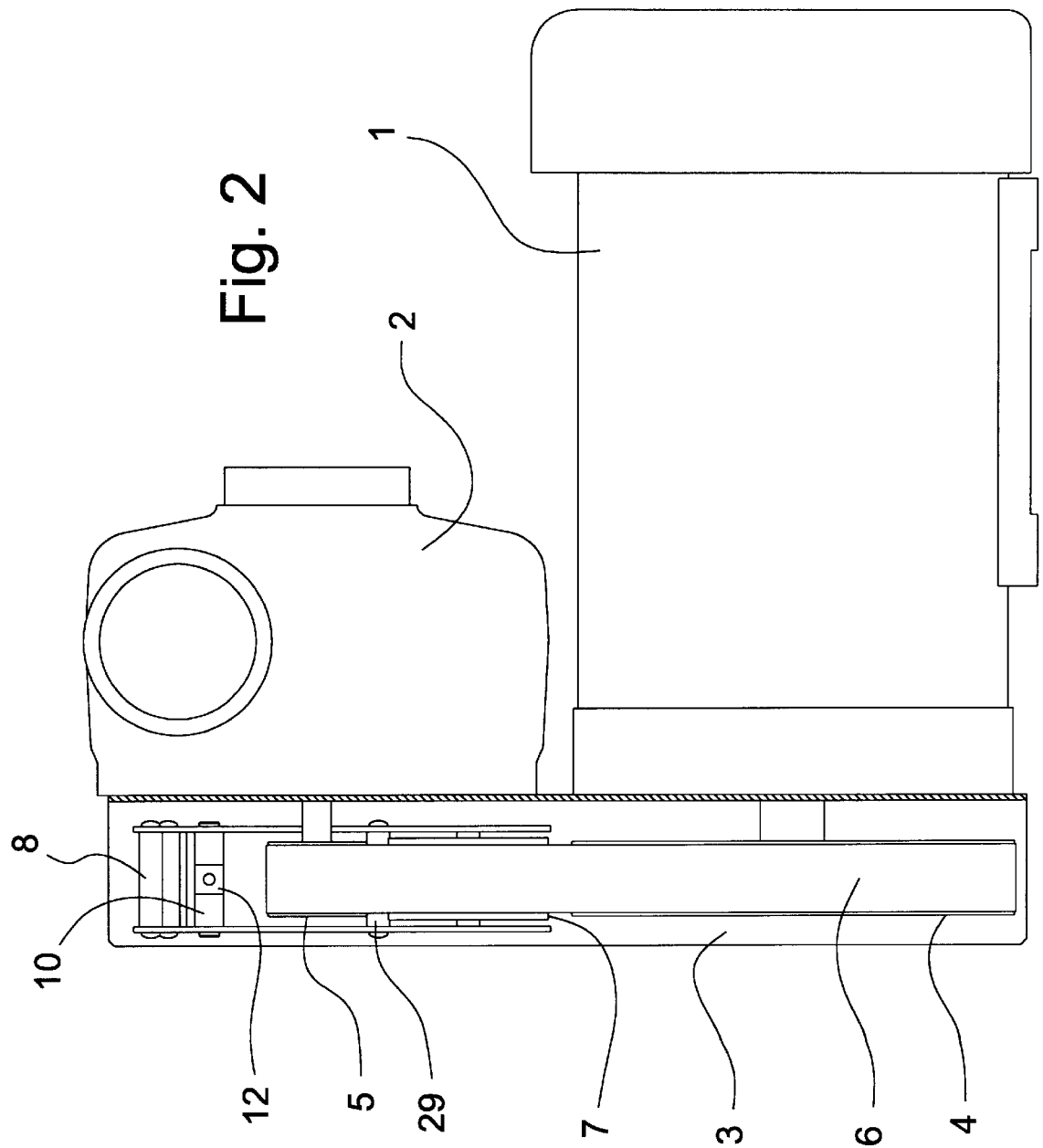
FIG. 2 is a side view of a blower assembly with the cover removed, and the near flange of the channel cut away.
Figure 3:
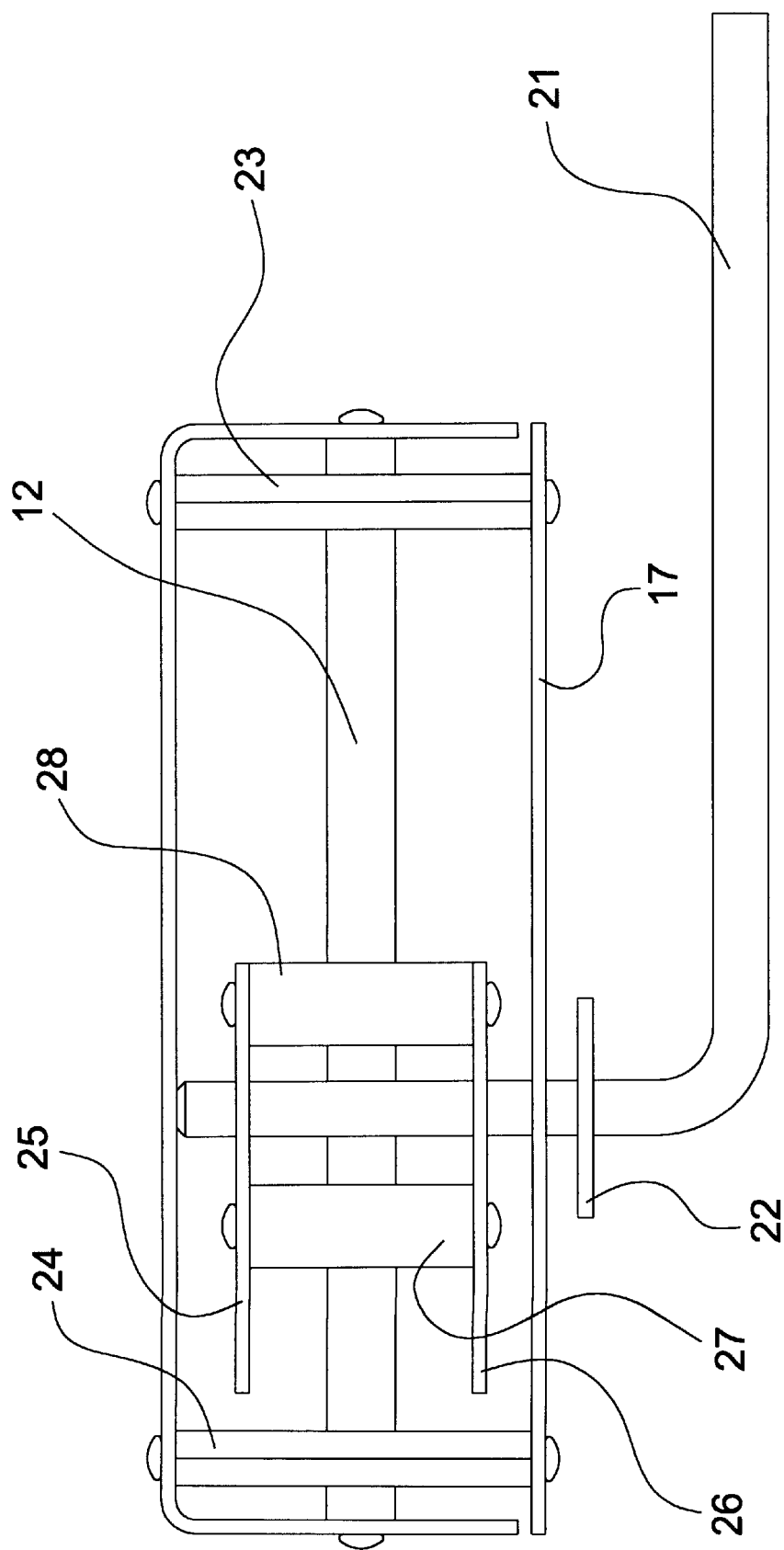
FIG. 3 is a top view of the channel with the cover installed, and with the wrench inserted in the movable support.

Referring to FIG. 1, channel 3 is attached to motor 1 and blower 2. First pulley 4 is mounted on the shaft of motor 1. Second pulley 5 is mounted on the shaft of blower 2. Belt 6, a Dayco Poly-rib in the preferred embodiment, connects the two pulleys. Fixed support 12 is attached to channel 3 and supports first pivot 10 which engages movable support 8 which is comprised of first plate 25, second plate 26, first spacer 27, second spacer 28, and third spacer 29 as shown in FIGS. 2 and 3. Movable support 8 is biased about first pivot 10 by the action of spring assembly 15 acting through second pivot 11. The other end of spring assembly 15 pivots in anchor block 16. Movable support 8 biases idler pulley 7 against belt 6 as shown in FIG. 1. FIG. 4 shows movable support 8 having rotated clockwise as indicated by visible mark 20 appearing in second aperture 19 in cover 17. Socket 9 is accessible through first aperture 18 in cover 17. Pin 30 is installed in 5th aperture 31 in cover 17 passing through to third aperture 13 in movable support 8 and fourth aperture 14 in channel 3, securing the arm in place for shipping, or for belt servicing. FIG. 3 shows cover 17 connected to channel 3 by first cover support 23 and second cover support 24. Fixed support 12 is attached to the two flanges of channel 3. Movable support 8 is comprised of first plate 25, second plate 26, first spacer 27, second spacer 28, and third spacer 29 shown on FIG. 2. Wrench 21 is shown engaged in first plate 25 and second plate 26. Disk 22 is shown attached to wrench 21. Although the above illustrations describe a preferred embodiment, many other embodiments are possible. The biasing means shown as a spring assembly 15 comprised of a heavy compression spring on a guide shaft, could as well be a rubber compression spring, a pneumatic cylinder, or a rubber bladder. The biasing force could also be a tension spring as long as the line of force moves over center. Gravity could also be used acting on a weight that also moves over center. The idler pulley 7 could also act on the inside of belt 6 rather than on the outside as shown in the preferred embodiment. The movable support 8 is shown as pivoting about first pivot 10. It could also be mounted on slides or flexures, and follow many different paths of movement.

OPERATION OF INVENTION

In manufacturing the machine, the movable support assembly is installed in the channel, rotated back against the channel, and secured in that position with pin 30. The motor 1 and Blower 2 can then be installed in safety. Then the belt 6 is installed in a slack condition, until pin 30 is removed, and using wrench 21 in socket 9, the movable support is moved over center until the idler pulley 7 is tensioning the belt 6. The cover 17 is then installed, and the machine is ready for testing and shipping with no further disassembly and later reassembly.

When the machine is subsequently run, either for testing, or when installed in the customers application, bump starting can be used without concern. If the connection is correct, the machine starts smoothly, and runs normally. If the connection is incorrect, the slack side belt starts to tighten with the first movement of the motor. This tightening of the slack side belt quickly propels the movable support over center until it contacts the channel. This contact is not destructive, since the belt was effectively disconnected from the first pulley 4 before it had gained significant speed, and because the movable support stays against the channel because of the bias of the spring assembly 15, there is no further movement, noise, or damage to the mechanism. If the device is not allowed to run at great length, the belt is usually undamaged as well.

When ever the system has been disconnected due to reverse rotation, a visible mark 20, a yellow day glow label in the preferred embodiment, aligns with the second aperture 19 in cover 17, providing a visual indication of the disconnected state. Wrench 21 can be inserted through first aperture 18 in cover 17 to engage socket 9 which exists in both first plate 25 and second plate 26. Rotating wrench 21 rotates movable support 8 about first pivot 10, bringing belt 6 back into normal engagement with all three pulleys without having to remove the cover 17. Disk 22 is welded to wrench 21, and overlaps first aperture 18, preventing the accidental pinching of fingers between the wrench and the cover.

When it is desired to replace the belt, the cover 17 must be removed. Then wrench 21 is then inserted in socket 9, the movable support 8 is rotated over center to rest against the channel 3, and pin 30 is inserted in third aperture 13 which exists in both first plate 25 and second plate 26, and further inserted until it enters fourth aperture 14 in channel 3, thus locking movable support 8 against any accidental movement. The slack belt 6 can then easily be removed and replaced with a new belt. Pin 30 is removed, the movable support 8 again rotated, wrench 21 removed, and cover 17 reinstalled. The unit is again ready to operate.

CONCLUSIONS, RAMIFICATIONS, SCOPE

Although the invention is presented in its application to centrifugal blowers, it can also be applied in other systems that are sensitive to reversed operation.

What is claimed is:

1. A belt system including a first pulley attached to a motor, a second pulley, a belt connecting said first and second pulleys, an idler pulley, a movable support for said idler pulley, including a socket in said movable support, and a wrench which can be inserted in said socket for the purpose of moving the support, a channel defining one limit of movement of said movable support, and an over center biasing means acting on said movable support, said over center biasing means capable of alternately biasing the movable support and idler pulley against the belt to comprise a functioning power transmission system, or against the channel, disconnecting the belt system.

2. The belt system of claim 1 which further includes a cover, said cover including a first aperture, substantially aligned with said socket, permitting the engagement of said wrench into the socket without removing the cover.

3. The belt system of claim 2, which further includes a second aperture in said cover, and a visible mark on said movable support, permitting a visual determination of the position of the movable support without removing the cover.

4. The belt system of claim 3, which further includes a disk affixed to said wrench to prevent the insertion and injury of a finger between the wrench and said cover.

5. The belt system of claim 4, which further includes a third aperture in said movable support, a fourth aperture in said channel, and a removable pin that can be inserted simultaneously in said third and fourth apertures, preventing the movable support from leaving the channel position when the belt is being changed.

* * * * *